United States Patent Office 3,472,904
Patented Oct. 14, 1969

3,472,904
HIGH TEMPERATURE, SHORT CONTACT-TIME PYROLYSIS OF TRICHLOROFLUOROMETHANE
John Richard Soulen, Narberth, and William Ford Schwartz, King of Prussia, Pa., assignors to Pennsalt Chemicals Corporation, Philadelphia, Pa., a corporation of Pennsylvania
No Drawing. Filed Oct. 12, 1965, Ser. No. 495,348
Int. Cl. C07c *17/26, 17/24, 19/08*
U.S. Cl. 260—653                                       8 Claims

ABSTRACT OF THE DISCLOSURE

Trichlorofluoromethane is pyrolyzed at a temperature within the range of about 900° C. to about 2000° C. for a period of from 0.0003 to 0.3 second to produce, as the major products, 1,2 - dichlorotetrafluoroethane, 1,2 - difluorotetrachloroethane and dichlorodifluoromethane.

---

This invention relates to the preparation of other organic fluorochloro compounds by the pyrolysis of trichlorofluoromethane. More particularly, this invention concerns pyrolyzing trichlorofluoromethane ($CCl_3F$) to produce, as the major products, 1,2-dichlorotetrafluoroethane ($CClF_2CClF_2$), 1,2 - difluorotetrachloroethane ($CCl_2FCCl_2F$), and dichlorodifluoromethane ($CCl_2F_2$). By "pyrolysis" is meant the transformation of a compound into another compound or other compounds through the agency of heat alone, and therefore the term includes not only the rearrangement of a compound but also the making of more complex compounds.

A. B. Trenwith and R. H. Watson, J. Chem. Soc., 1957, pp. 2368–2372, describe the pyrolysis of $CCl_3F$ at temperatures ranging from 440° C. to 745° C. The principal products were $CCl_2F_2$, $CCl_4$ and chlorine. There was no evidence of fluorochloroethanes being formed as reaction products in this prior art process.

It has now been discovered that the comparatively high temperature pyrolysis of $CCl_3F$, i.e., in the range of about 900° C. to about 2000° C., unexpectedly produces $CCl_2FCCl_2F$ and $CClF_2CClF_2$, as well as $CCl_2F_2$, as the principal reaction products (the relative proportions thereof depending on the particular pyrolysis temperature used), and as minor products, $CCl_2FCClF_2$ and $CClF_3$. However, the time of the pyrolysis reaction embodied herein is very short and should not exceed about 0.3 second. The product $CCl_2FCCl_2F$ is useful as a component in anti-knock additive compositions for gasoline (U.S. Patent 3,074,788). $CClF_2CClF_2$ is a valuable refrigerant used mainly in systems having centrifugal rotary compressors. $CCl_2F_2$, $CClF_3$ and $CCl_2FCClF_2$ also are useful as well-known refrigerants and, moreover, $CCl_2F_2$ and $CClF_3$ can also be pyrolyzed at high temperatures to produce additional $CClF_2CClF_2$, as set forth in our copending applications Ser. No. 497,535, filed Oct. 18, 1965, now Patent No. 3,367,983, and Ser. No. 499,084, filed Oct. 20, 1965 now Patent No. 3,388,391, repsectively.

As stated above, the pyrolysis of $CCl_3F$ is carried out according to this invention at temperatures within the range of about 900° C. to about 2000° C. With regard to the yields of the desired fluorochloroethanes, the lower temperatures within said range, e.g., from about 900° C. to about 1400° C. favor the production of $CCl_2FCCl_2F$, while from above about 1400° C. to about 2000° C. encourages the preparation of $CClF_2CClF_2$. The higher temperatures also favor the production of $CCl_2F_2$.

As earlier stated, in combination with the high pyrolysis temperatures employed in accordance with this invention, very short contact times of the $CCl_3F$ at such temperatures are used, that is, contact times on the order of about 0.0003 to about 0.3 second, preferably in the range of about 0.0006 to about 0.06 second. At contact times of the usual order of magnitude used in pyrolyses of this type, i.e., of the order of about 10 seconds and higher, the process of this invention is inoperative due to degradation of the reactant and reaction products. As used herein, contact time is defined as follows:

Contact time (seconds) =

$$\frac{\text{Heated reactor volume}}{\text{Volume of gas per second (calculated at reaction temperature and pressure) fed to reactor}}$$

The short contact times indicated above for the process of this invention correspond to very high space velocities ranging from about 100 to about 100,000 per hour which permits a high rate of feed and reduces reactor volume needed. Space velocity is defined as volumes of reactant (measured at standard temperature and pressure (STP), i.e., 0° C. and 760 mm. Hg) per volume of heated reactor per hour. This is in sharp contrast to the much lower space velocities previously employed in the pyrolysis of $CCl_3F$, on the order of about 10 per hour. For example, A. B. Trenwith and R. H. Watson, J. Chem Soc., ibid., used the extended reaction times of about 110 to about 155 seconds in pyrolyzing $CCl_3F$ at 440° C. to 745° C.

The reaction pressure in the present process is not critical and may be atmospheric, subatmospheric, or superatmospheric. Superatmosprheric pressure may range, e.g., up to about 10 atmospheres. However, atmospheric and subatmospheric presure operation will generally be found most convenient. As a practical limit, pressures lower than about one mm. Hg abs. are not recommended. Preferred operating pressures will generally range from about 10 mm. Hg to atmospheric pressure.

The reaction is conveniently carried out by continuously passing a stream of the $CCl_3F$ feed through an elongated tube preferably having a high ratio of wall area to cross-sectional area so that heat may be rapidly and continuously transferred from the heated reactor walls to the gaseous reactant. The reactor should be constructed of materials resistant to attack by the reactant and reaction products at the high operating temperatures. Materials of this type include, for example, inert graphite, boron nitride, and like inert materials. The reactor can be heated to the desired reaction temperatures in any suitable manner such as by electrical induction heating or by placing the reactor in an electrically heated furnace.

The products of the pyrolysis passing from the reactor are cooled and usually will be scrubbed in caustic solution or other alkaline solution to remove acidic inorganic by-products (e.g. chlorine and fluorine). The organic products are separated from the reaction mixture in a conventional manner by fractional distillation. The unreacted $CCl_3F$ can, of course, be recovered for recycling purposes.

EXAMPLES

In the experiments herein described, specific embodiments of the invention are set forth to illustrate and clarify the invention.

Gaseous $CCl_3F$ is passed continuously at a measured rate through a 1/8" I.D. x 1/2" O.D. x 13" long, inert graphite tube reactor centered within a 2" diameter "Vycor" high-silica glass tube, 15" long. The reactor is inductively heated with a 3¼" long load coil of 12 turns of ¼" copper tubing about the "Vycor" tube, the power for said coil supplied by a high frequency generator with a maximum output of 7.5 kilowatts operating at 450 kilocycles. The effective reaction zone in the tube is thus 3¼ inches. The temperature of the reactor is measured with an optical pyrometer focused on the center of the heated portion of the tube. Examination of the inert graphite reactor after repeated runs therein reveals that its inner surface is unaffected by the passage of the hot gases therethrough.

The product mixture passes from the reactor and is condensed in a trap cooled with liquid nitrogen. The condenser is vented to a mechanical vacuum pump which maintains the subatmospheric reaction pressure employed in these examples. After completion of the run, the reaction products are warmed to room temperature and transferred to an evacuated stainless steel cylinder. The reaction products are then passed through a series of scrubbers containing aqueous solutions of sodium hydroxide to remove the inorganic by-products. The organic reaction products are analyzed using gas-liquid chromatographic and infrared analyses techniques.

The data from eight runs are summarized in the table. In addition to the components listed in the "Product" column of the table, the reaction products contained unreacted $CCl_3F$ and varying minor amounts of $CHCl_2F$, $CHCl_3$, $CCl_4$, $CCl_3CCl_2F$ and $CCl_2=CCl_2$.

TABLE

| Example | Pyrolysis conditions | | | | Percent conversion of $CCl_3F$ | Weight percent in recovered converted product of— | | | | |
|---|---|---|---|---|---|---|---|---|---|---|
| | Feed rate of $CCl_3F$, gms.³/min. | Pressure, mm. Hg Abs. | Temp., °C. | Contact time, seconds | | $CCl_2FCClF$ | $CClF_2CClF_2$ | $CCl_2FCClF_2$ | $CCl_2F_3$ | $CClF_3$ |
| 1 | 0.281 | 13 | 1,015 | 0.0029 | 13.6 | 90.3 | Trace | 3.9 | Trace | Trace |
| 2 | 0.44 | 35 | 1,115 | 0.0046 | 23.2 | 80.2 | 0.2 | 3.3 | 10.2 | 0.6 |
| 3 | 0.595 | 39 | 1,230 | 0.0035 | 59.0 | 71.0 | Nil | 6.1 | 9.5 | 3.5 |
| 4 | 0.308 | 44 | 1,380 | 0.0069 | 73.4 | 11.7 | 3.6 | 7.2 | 56.3 | 10.9 |
| 5 | 0.608 | 35 | 1,485 | 0.0026 | 92.5 | 4.3 | 18.9 | 4.7 | 55.9 | 14.0 |
| 6 | 0.22 | 41 | 1,585 | 0.0080 | 90.7 | 1.7 | 7.7 | 1.9 | 72.3 | 8.2 |
| 7 | 0.255 | 26 | 1,700 | 0.0041 | 91.2 | 0.7 | 31.9 | 2.0 | 54.6 | 5.2 |
| 8 | 0.1575 | 45 | 1,805 | 0.0109 | 77.0 | 0.7 | 20.2 | 1.7 | 66.7 | 4.6 |

It is to be understood that the foregoing illustrative examples should not be construed as limitative of the scope of the invention which is defined by the appended claims.

We claim:

1. The method which comprises pyrolyzing trichlorofluoromethane at a temperature of from about 900° C. to about 2000° C. wherein the pyrolysis time is from about 0.0003 to about 0.3 seconds, a product of the pyrolysis being at least one fluorochloroethane selected from the group consisting of 1,2-dichlorotetrafluoroethane; 1,2-difluorotetrachloroethane and 1,1,2-trichloro-1,2,2-trifluoroethane.

2. The method of claim 1 wherein the pyrolysis time is from about 0.0006 to about 0.06 second.

3. The method of claim 1 wherein the pyrolysis temperature is from about 900° C. to about 1400° C.

4. The method of claim 3 wherein the pyrolysis time is from about 0.0006 to about 0.06 second.

5. The method of claim 1 wherein the pyrolysis temperature is from about 1400° C. to about 2000° C.

6. The method of claim 5 wherein the pyrolysis time is from about 0.0006 to about 0.06 second.

7. The method of pyrolyzing trichlorofluoromethane which comprises passing trichlorofluoromethane through a tube heated to a temperature of from about 900° C. to about 2000° C., wherein the contact time is within the range of about 0.0003 to about 0.3 second, a product of the pyrolysis being at least one fluorochloroethane selected from the group consisting of 1,2-dichlorotetrafluoroethane; 1,2-difluorotetrachloroethane and 1,1,2-trichloro-1,2,2-trifluoroethane.

8. The method of pyrolyzing trichloromethane which comprises passing trichlorofluoromethane through a tube heated to a temperature of from about 900° C. to about 200° C., wherein the contact time is within the range of about 0.0006 to about 0.06 second, a product of the pyrolysis being at least one fluorochloroethane selected from the group consisting of 1,2-dichlorotetrafluoroethane; 1,2-difluorotetrachloroethane and 1,1,2-trichloro-1,2,2-trifluoroethane.

References Cited

UNITED STATES PATENTS 2,687,440   8/1954   McGrew et al. ____ 260—653.3
3,188,356   6/1965   Hauptschein et al. __ 260—653.5

FOREIGN PATENTS 699,781   12/1964   Farlow.

OTHER REFERENCES

Trenwith et al., J. Chem. Soc., 1957, pp. 2368–2372.

DANIEL D. HORWITZ, Primary Examiner

U.S. Cl. X.R.
260—253.8, 654, 664

UNITED STATES PATENT OFFICE
CERTIFICATE OF CORRECTION

Patent No. 3,472,904               Dated    October 14, 1969

Inventor(s)  John Richard Soulen and William Ford Schwartz

It is certified that error appears in the above-identified patent and that said Letters Patent are hereby corrected as shown below:

In Column 1, lines 58-59 "repsectively" should read .. respectively...

In Column 2, line 30 "Superatmosprheric" should read .. Superatmospheric..

In Column 2, line 32 "presure" should read ... pressure....

In Column 3, Table, third line of second column from left "gms.$^3$/min." should read ... gms/min. ....

In Column 4, Table, second column from right heading "$CCl_2F_3$" should read .... $CCl_2F_2$....

In Column 4, Claim 8, line 1 "trichloromethane" should read .... trichlorofluoromethane......

In Column 4, Claim 8, line 4 "200°C" should read .... 2000°C......

SIGNED AND SEALED
MAY 19 1970

(SEAL)
Attest:

Edward M. Fletcher, Jr.
Attesting Officer

WILLIAM E. SCHUYLER, JR.
Commissioner of Patents